No. 897,670. PATENTED SEPT. 1, 1908.
A. K. SLOAN, Jr.
ELECTRICAL IMPULSE RECORDER.
APPLICATION FILED APR. 22, 1908.
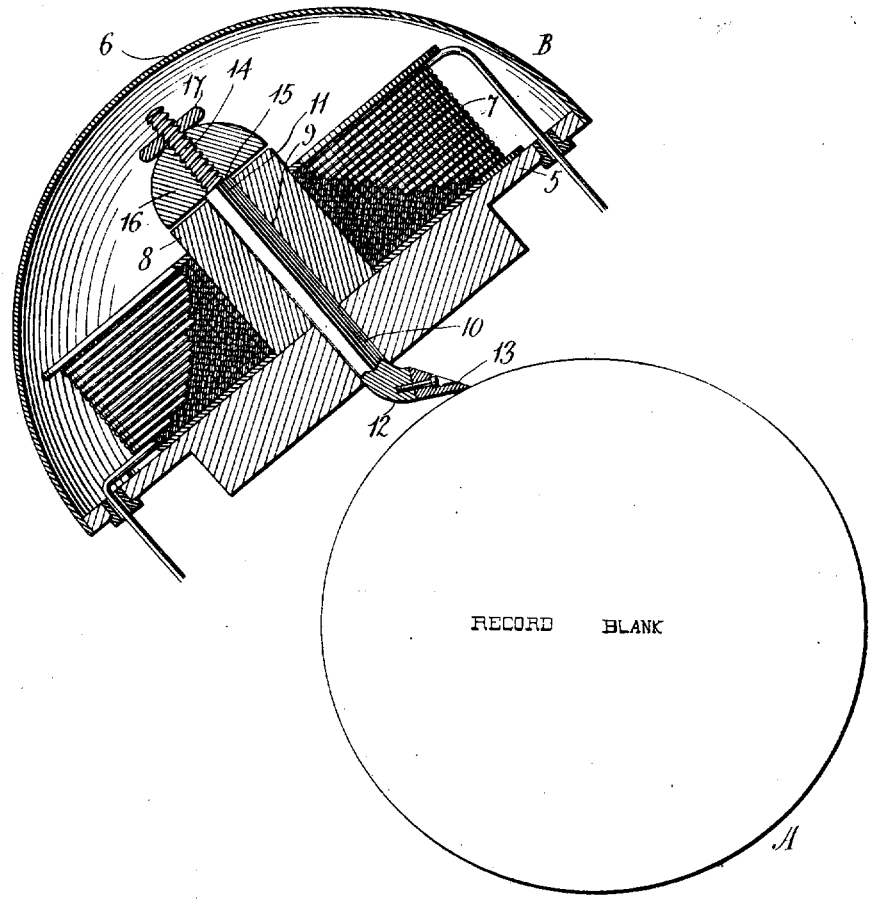
Inventor
Augustus Kellogg Sloan, Jr.

UNITED STATES PATENT OFFICE.

AUGUSTUS K. SLOAN, JR., OF BROOKLYN, NEW YORK.

ELECTRICAL IMPULSE-RECORDER.

No. 897,670.   Specification of Letters Patent.   Patented Sept. 1, 1908.

Application filed April 22, 1908. Serial No. 428,673.

*To all whom it may concern:*

Be it known that I, AUGUSTUS K. SLOAN, Jr., a citizen of the United States, residing at Brooklyn, in the county of Kings, State of New York, have invented certain new and useful Improvements in Electrical Impulse-Recorders; and I do hereby declare the following to be a full, clear, and exact description of the invention, such as will enable others skilled in the art to which it appertains to make and use the same.

The present invention relates to improvements in electro-magnetic instruments designed primarily for use in recording wireless-telephonic and telegraphic messages.

The recording instruments ordinarily included in wireless telephonic and telegraphic apparatus are open to the general defect that no provision is made for varying the speed at which the messages transmitted are received; consequently, in many instances, the speed of transmission exceeds the ability of the receiving operator, and the message for this reason is either lost or imperfectly received and incorrectly recorded.

It is the principal object of this invention, therefore, to provide an extremely simple and efficient recording instrument in which such defect is completely avoided, to which end the invention contemplates the provision of an electro-magnetic instrument by means of which the message transmitted may be inscribed upon a phonographic or similar record blank, and subsequently reproduced therefrom in the ordinary manner, the speed at which such reproduction is effected being completely under the control of the receiving operator who is thus enabled to vary the speed to suit the existing circumstances.

Briefly described, the instrument which forms the subject matter of the invention comprises an electro-magnet through which the electric current passes, and a stylus which carries the armature and is movable through the core of the magnet in the direction of the record blank, in which latter depressions of greater or less depth are cut according to the amplitude of fluctuation of the current.

In the accompanying drawings there is shown a vertical sectional view through the instrument embodying my invention, it being placed in operative relation with respect to a record here diagrammatically shown as a graphophone cylinder record.

In the figure of the drawings, the graphophone cylinder or other record blank is indicated in general by the reference character A and the instrument embodying my invention in general by the reference character B. As has heretofore been stated, the instrument includes an electro magnet and this magnet is inclosed in a casing, the base of which is indicated by the numeral 5 and the cap or body by the numeral 6, the latter being preferably semi-spherical in form. The electro magnet has its winding indicated by the numeral 7 and its core by the numeral 8. The said electro magnet is supported upon the base 5 of the casing and its core 8 is formed with a longitudinally and axially extending bore 9, the lower end of which registers with an opening 10 formed through the base 5, the said base being preferably thickened at its center and surrounding said opening. Both the bore 9 and the opening 10 are four-sided as shown in the drawings although they may have any other contour corresponding of course to the cross sectional contour of the stylus which is received therein, I having preferably formed the bore and opening four-sided and the stylus rectangular in cross section so as to prevent turning or rotation of the stylus within the bore and opening.

The stylus mentioned above is indicated by the numeral 11 and is preferably formed of brass although, any other non-magnetic metal or material may be employed in its manufacture and this stylus, as previously stated, is received in the bore and the opening and has its lower end, turned to a slight degree in the direction or rotation of the record A as indicated at 12 said end being provided with the usual point 13 which may be of silicon carbid or any other material employed for a like purpose. The upper end of the stylus 11 is reduced and threaded as indicated by the numeral 14, the reduction of the said end resulting in the formation of a shoulder 15 which, when the point 13 of the stylus is in position against the record A, is located in a plane very slightly above the upper end of the core 8 of the electro magnet. An armature 16, preferably of soft iron is threaded upon the reduced threaded portion 14 of the stylus and is held in adjusted position thereon by means of a set or jam nut 17 also engaged upon the said reduced threaded portion 14.

The operation of the instrument is as follows, it being of course interposed in the telegraph, telephone or other signal circuit, in connection with which the instrument is used. Fluctuation or current intensity incident to the reception of a message will of course result in the armature 16 being attracted to the core 8 of the electro-magnet so as to bear at its point against the record with a greater or less degree of firmness according to the amplitude of such fluctuation, and depressions of various depths will be in this manner cut in the record, it being of course rotated in the usual manner.

What is claimed is—

1. An electro-magnetic recording instrument comprising a record blank; a solenoid; a stylus movable endwise through the core of the solenoid; and an armature carried by the stylus for moving the latter in the direction of the record blank under the influence of the solenoid.

2. An electro-magnetic recording instrument, comprising a record blank; a solenoid having its core provided with an axial bore angular in cross-section; a stylus movable endwise through said bore; and an armature carried by the stylus, for moving the latter in the direction of the record blank under the influence of the solenoid, said stylus being formed angular in cross-section, whereby it is held against rotation during its endwise movement.

3. An electro-magnetic recording instrument, comprising a record blank; a solenoid; a stylus movable endwise through the core of the solenoid; an armature carried by the stylus, for moving the latter in the direction of the record blank under the influence of the solenoid, said armature being adjustable upon the stylus to vary the depth of the indentations made upon said record blank; and means for locking the armature in its adjusted position.

In testimony whereof, I affix my signature, in presence of two witnesses.

A. K. SLOAN, Jr.

Witnesses:
S. E. MERRY,
THOS. D. MCELHEINE.